UNITED STATES PATENT OFFICE.

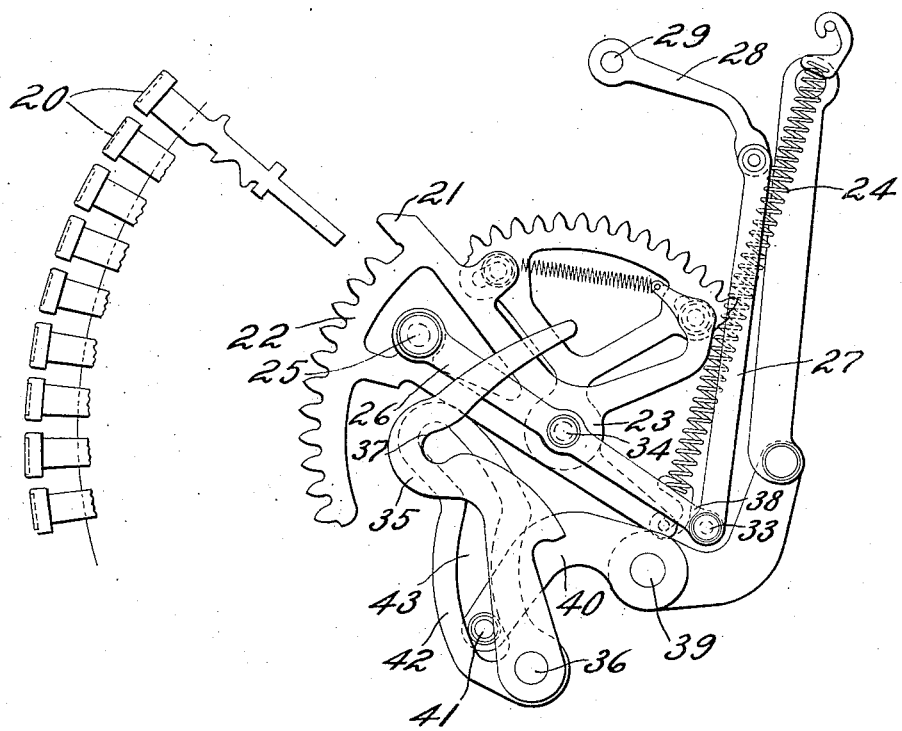

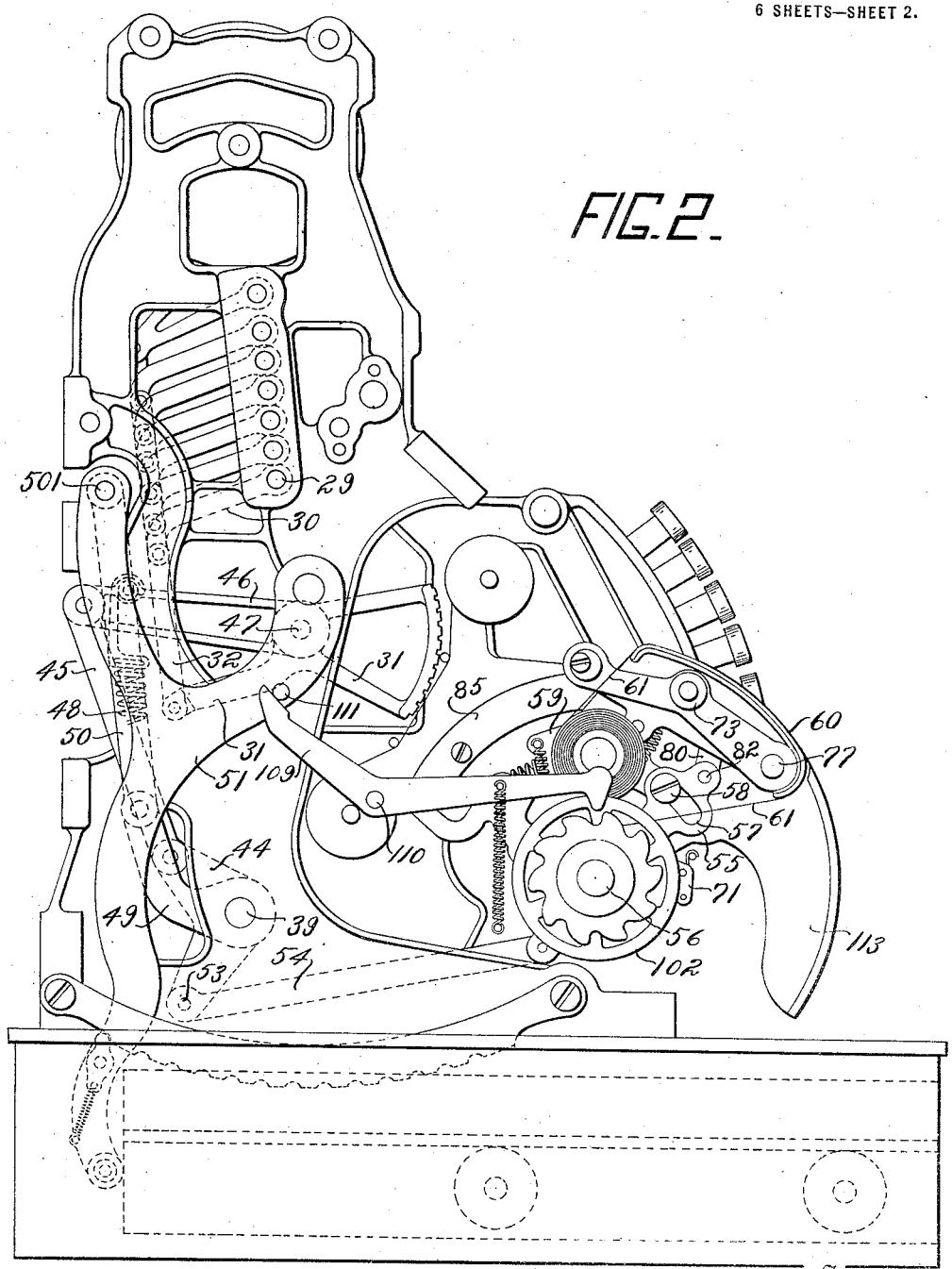

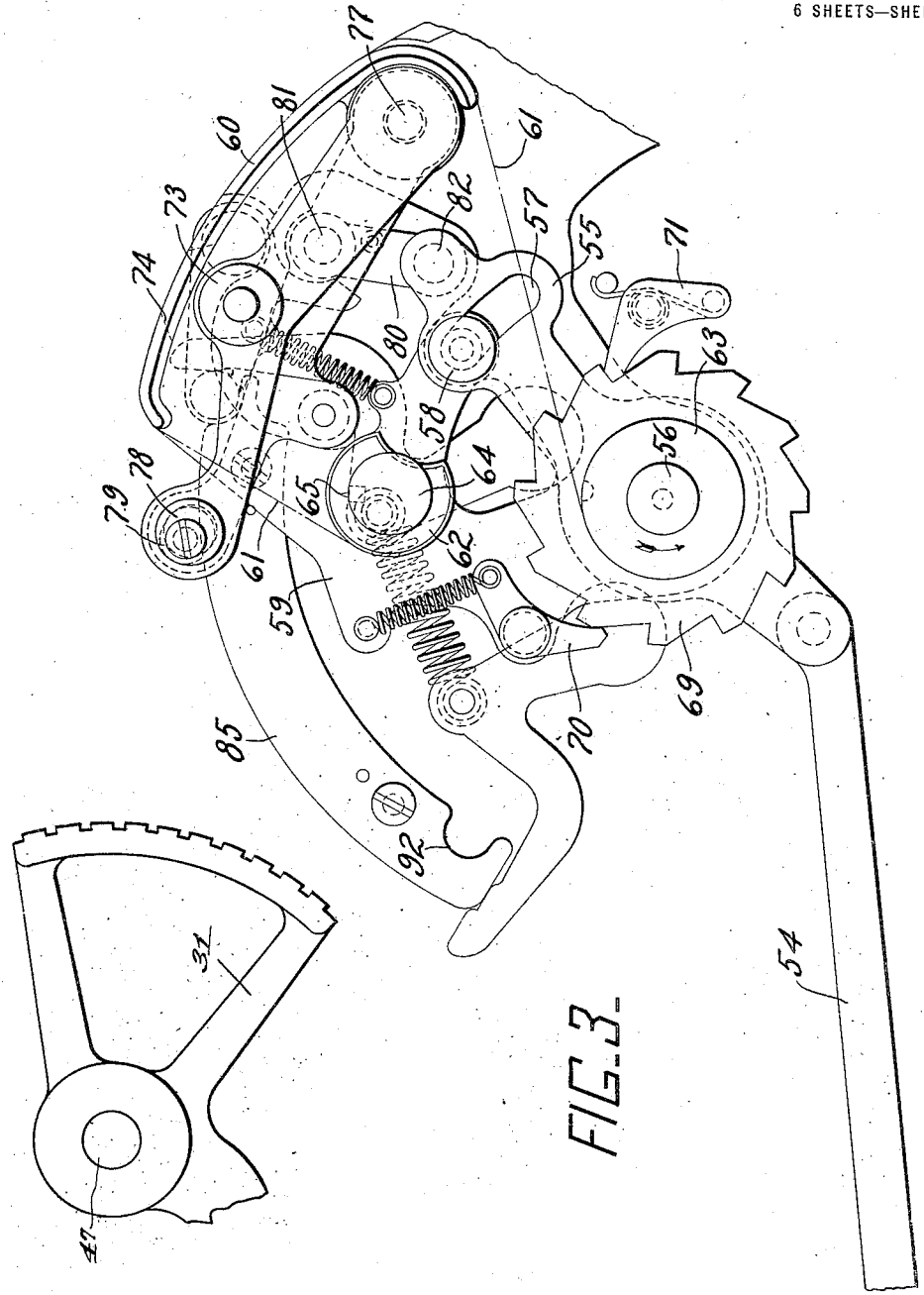

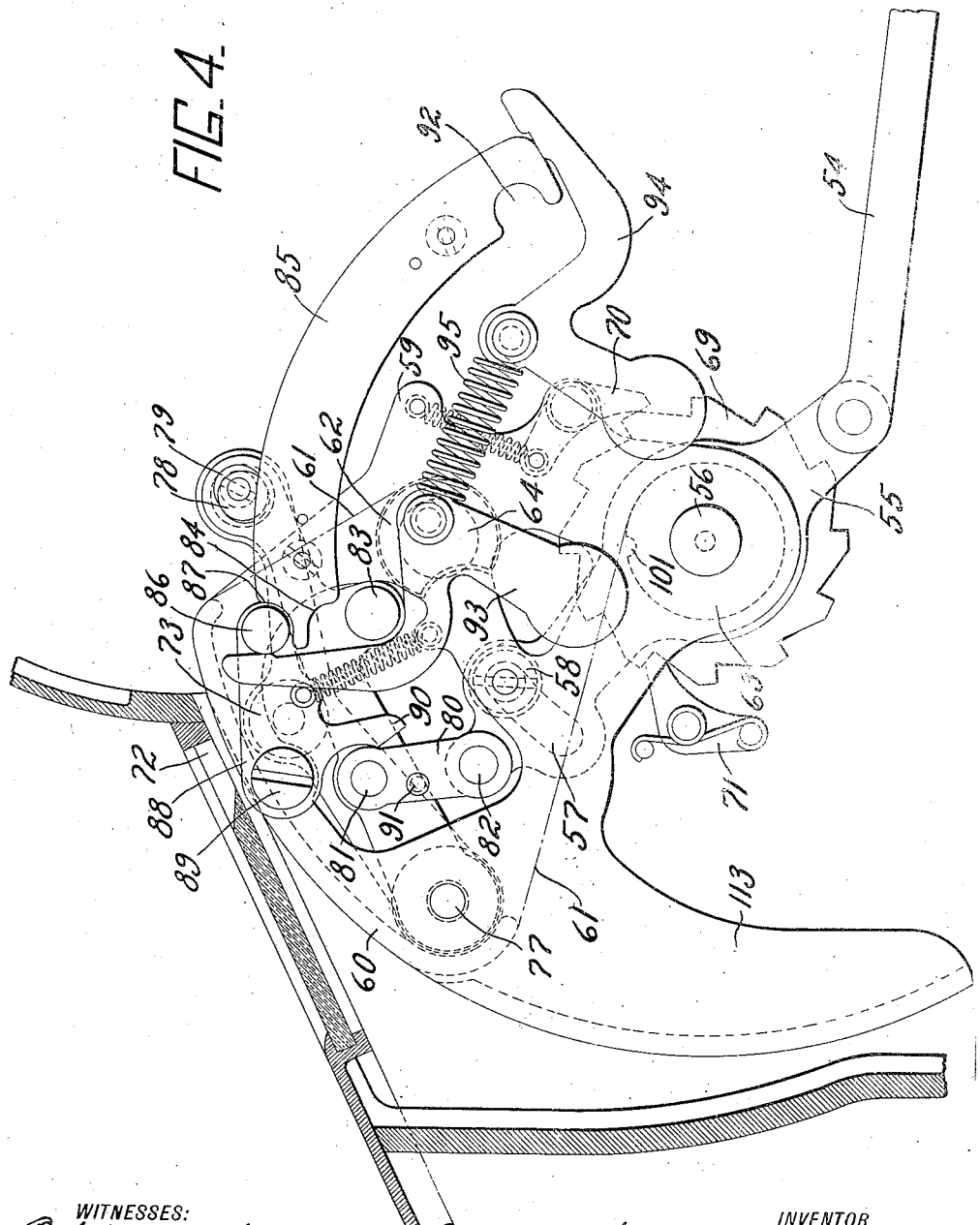

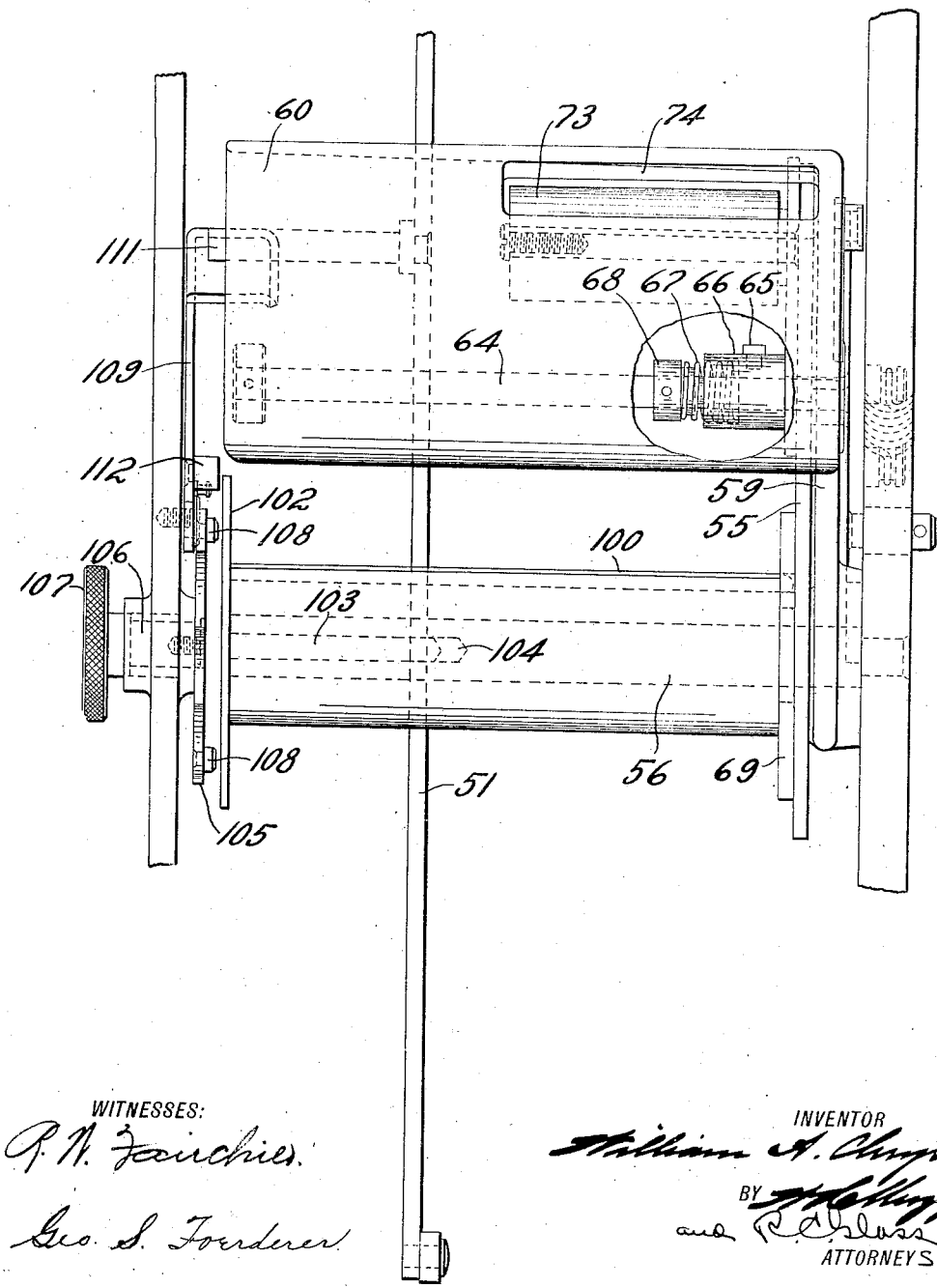

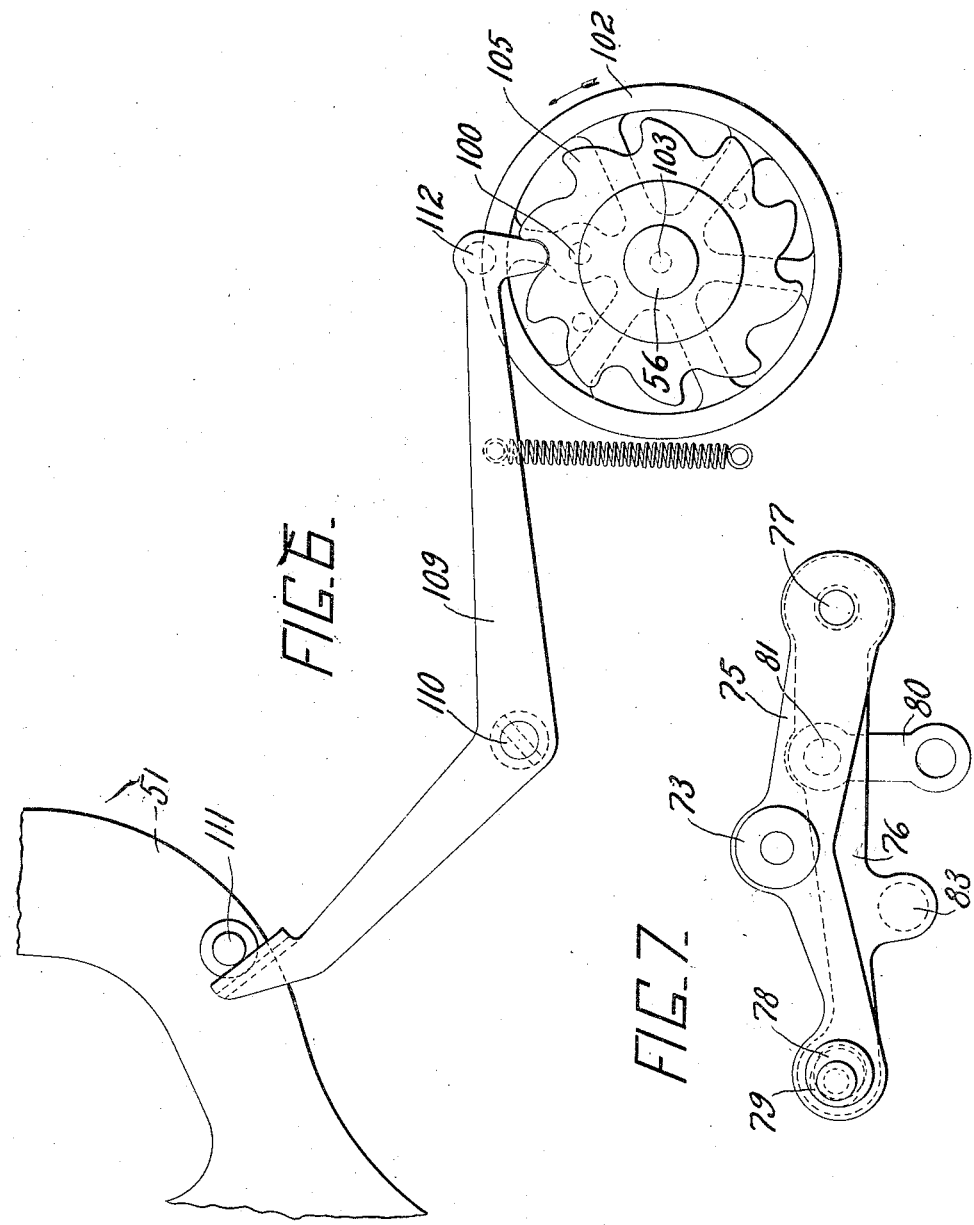

WILLIAM A. CHRYST, OF DAYTON, OHIO, ASSIGNOR TO THE NATIONAL CASH REGISTER COMPANY, OF DAYTON, OHIO, A CORPORATION OF OHIO, (INCORPRATED IN 1906.)

CASH AND AUTOGRAPHIC REGISTER.

1,140,443.

Specification of Letters Patent. Patented May 25, 1915.

Application filed April 22, 1910. Serial No. 556,947.

*To all whom it may concern:*

Be it known that I, WILLIAM A. CHRYST, a citizen of the United States, residing at Dayton, in the county of Montgomery and State of Ohio, have invented certain new and useful Improvements in Cash and Autographic Registers, of which I declare the following to be a full, clear, and exact description.

This invention relates to cash registers and has more particular reference to that class of registers in which a detail record is kept of sales made, particularly in the form of a strip of record material bearing a detailed printed record of all sales.

It has often been found desirable to identify some one of such printed details with some particular sale or person and in the attainment of this desire means are provided whereby a written entry may be made on the record strip in alinement with the printed entry. Such entry may consist in instances of a charge sale of the name of the purchaser, of money paid out the cause of such payment, or if the machine be used in shoe stores or stores of like nature a stock number or suitable identifying entry may be made beside each printed item.

For the sake of illustration the invention has been shown as applied to the type of machine shown in an application for Letters Patent of the United States filed by Charles F. Kettering and William A. Chryst on September 21st, 1908, Serial No. 451,446 and reference may be made to said application for a more detailed description of such machine as only so much of the same is shown and described as is deemed essential to a proper understanding of the same.

It is to be understood, however that it is not intended to limit the invention to the embodiment shown herein, as it is obvious that it may equally as well be applied to other types of machines without departing from the spirit of the invention.

With these and incidental objects in view, the invention consists in certain novel features of construction and combinations of parts, the essential elements of which are set forth in appended claims, and a preferred form of embodiment of which is hereinafter described with reference to the drawings which accompany and form part of the specification.

Of said drawings; Figure 1 is a plan view on a reduced scale of the differential mechanism of a machine of the type to which the present improvements are shown as applied. Fig. 2 is a side view of the main operating mechanism of the machine of the same type and showing connections for operating the movable record bearing table. Fig. 3 is a left hand side view of one embodiment of the invention, certain of the parts being omitted and broken away for the sake of clearness. Fig. 4 is a right hand side view of the parts showing a portion of the cabinet provided with the writing and sight openings and the means for closing the writing opening when the record table is in printing position. Fig. 5 is a front view of the strip holder, parts of the same being omitted or broken away for the sake of clearness, and showing the tensioning and hand feed devices for the record strip. Fig. 6 is a side view of the device for locking the hand feed device when the record table is in printing position. Fig. 7 is a detail view of the impression roll frame.

The machine illustrated in the above mentioned application is of the drawer operated type, that is, the driving mechanism is actuated by the opening and closing movements of the cash drawer. The drawer is normally spring pressed outward, but is restrained from such movement by a latch which is operated to release the drawer, upon the depression of certain keys of the machine. The drawer then opens under the spring action and is returned by hand to its closed position. Upon the return movement of the drawer the record which is set up on the key board is recorded by the machine; such record including the printing of the amount of each transaction on a detail strip this amount being accompanied by the identifying mark of the clerk making the sale and of the style of transaction, viz., "cash", "charge", "paid out", "no sale" or "rec'd on account".

In the embodiment of the invention as shown in the drawings is provided a detail record strip of sufficient width to permit of a written entry being made thereon in alinement with the items as printed by the machine. This record strip is carried by a printing and writing table or carrier adapted to rock on a suitable pivot. In normal condition this table is in a position to expose a portion of the strip at an opening in the inclosing casing and thus permit of a written entry being made on that portion of the strip, prior to the beginning of an operation of the machine. After making a written entry on the strip, the operator then depresses the proper keys and releases the drawer. Suitable operating connections are provided intermediate the main operating member and the rocking table to effect a rocking of said table to a position in which a printed record of the transaction may be made on the strip in alinement with the written entry. Upon the closing movement of the drawer the printing is effected and the table is restored to normal writing position. During such restoring movement the paper strip is fed an extent sufficient to bring a new space to the writing opening. A sight opening in the casing is provided, said opening being covered with glass or other transparent material to permit of a display of the last few entries made on the strip, and suitable locking devices are provided to insure proper operation of the parts and to prevent any fraudulent manipulation of the device.

Referring to the drawings Figs. 1 and 2 show the general operation of a machine of the type to which the present improvements are shown as applied. Only one bank of keys and its differential mechanism has been shown as such mechanism is merely duplicated for the several banks.

When any one of the keys 20 is depressed its rear end acts as a stop in the path of an extension 21 on a differential segment 22. This segment 22 is pivoted at about 23 and is normally urged downward and forward to bring its extension 21 into engagement with the rear end of the depressed key 20 by a spring 24. This movement is permitted upon the opening of the cash drawer. The differential segment 22 has pivoted to its side by a pin 25 a beam 26 which is connected by a link 27 to an arm 28 rigidly mounted on a shaft 29 which shaft extends through the machine and has mounted on its other end a similar arm 30 which is connected to the rear end of a pivoted type carrier by a link 32. When the segment 22 is rocked on its pivot under action of spring 24 the beam 26 will rock downward at its forward end and about the pivot 33. This beam 26 carries a roller 34 which is acted upon by a V shaped cam 35. This cam is mounted upon a shaft 36 which shaft is oscillated during the latter part of the outward movement of the cash drawer so that the cam 35 will move toward the roller 34 and position the same by the cut 37 of the cam 35 and in so doing, will rock the end 38 of the beam 26 to a position which exactly corresponds to the difference between the extent of forward movement of the segment 22 and the position in which the roller 34 was left at the previous operation of the machine. It will readily be seen that this movement of the beam 26 will, through the medium of link 27, arm 28, shaft 29, arm 30 and link 32, serve to adjust the type carrier 31 according to the key 20 which was depressed.

The oscillation of shaft 36 is effected from shaft 39 through the medium of an arm 40 mounted on said shaft 39, an anti-friction roller 41 mounted on said arm 40 and cam 42 rigidly mounted on shaft 36, said roller 41 playing in a slot 43 in the cam 42. Mounted fast on shaft 39 is a bell crank lever 44 one arm of which is connected by a link 45 to an arm 46 pivoted at 47. A main operating spring 48 connected to arm 46 tends to rock said arm about its pivot 47 and consequently tends to rock shaft 39 through the medium of link 45 and lever 44 just referred to. This rocking of the shaft 39 is normally prevented however, in the following manner. Rigidly mounted on shaft 39 is a lever 49 pivotally connected at its outer end to one end of a link 50 the other end of which is pivotally connected by a pin 501 to one of the upper arms of a V shaped main operating lever 51 pivoted to the main frame at 52 by the other of its upwardly extending arms. The downwardly extending arm of said lever 51 is adapted to swing forwardly at each operation of the machine and is normally prevented from doing so by reason of its engagement with the rear part of the drawer as shown in Fig. 2.

When the keys are depressed and the drawer released, the arm 51 swings forward thereby permitting the rocking of shaft 39 under the action of spring 48 and this through the medium of the connections above described will rock shaft 36 and cam 35 to adjust the beam 26 and consequently the type carrier 31. Upon the closing of the drawer all parts will be swung back to normal position.

The bell crank 44 has a downwardly projecting arm to which is pivoted by a pin 53, one end of a link 54 the other end of which is pivotally connected to the lower end of an arm 55 pivoted to rock about a stub shaft 56. (See Figs. 3 and 4). The upper end of said arm 55 is provided with a slot 57 which slot coöperates with a stud pin 58 mounted on the side of a rocking paper carrying table 59, said table being also mounted to rock about the shaft 56. Upon the rocking of shaft 39, as hereinbefore described, such rocking movement will be transmitted to the table 59 through the medium of bell crank 44, link 54, and arm 55. The slot and pin connection 57 and 58 intermediate the arm 55 and table 59 is provided to permit of a slight preliminary rocking movement of the arm 55 in each direction in excess of such movement of the table for a purpose hereinafter described. The table 59 is provided with a laterally projecting writing plate 60 which plate is adapted to carry a wide record strip 61 adapted to receive written and printed entries for record. The strip 61 is fed from a supply roll 62 over said plate 60 and on to a receiving or feeding roll 63. The supply roll is mounted on a stub shaft 64 carried by table 59. The core of the supply roll is adapted to be engaged by a small knife or feather 65 in a collar 66 mounted to rotate on shaft 64. A heavy spring 67 is interposed between the collar 66 and a collar 68 rigidly mounted on the shaft 64 and the collar 66 is thereby pressed against the side plate of the table 59 to create sufficient friction to prevent a too rapid unwinding of the record strip. The record strip passes from the supply roll 62 over the writing plate 60 and thence to the feeding or receiving roll 63. The feeding roll 63 is mounted to turn on stub shaft 56 and has mounted on one end a ratchet wheel 69 which ratchet coöperates with a pawl 70 mounted on table 59 and a pawl 71 mounted on the side frame of the machine to advance the record strip in the following manner. When the table 59 is rocked to the left in Fig. 3 the pawl 70 will engage the tooth of ratchet 69 just in advance of it in normal position and will cause the roll 63 to turn with the table. It is obvious, however, that this turning of the roll 63 will not effect any feeding movement but the ratchet will move the distance of one tooth to permit the pawl 71 to engage the succeeding tooth. When the table is then rocked back to normal position the ratchet 69 is held against return movement by pawl 71 and the record strip is thus fed one step.

The paper is fastened to the receiving roll by a pin 100 playing in a groove 101 in the receiving roll and carried by a spoked wheel 102 mounted concentrically with the receiving roll 63 on a pin 103 adapted to enter a hole 104 formed in the shaft 56 to form a bearing for said wheel, (see Figs. 5 and 6).

As it is sometimes desired to feed the record strip by hand there is mounted adjacent said wheel 102, a disk 105 having a toothed periphery and being mounted on a short shaft 106, mounted to turn in the cabinet side, on the outer end of which shaft 106 is a knurled knob 107 spring pressed outwardly. The disk 105 is provided with two lugs 108 adapted, when the disk 105 is pushed inward, to engage the spokes of wheel 106, whereby a turning of the knob 107 will effect an advance of the record strip. Mounted on the side of the cabinet is a lever 109 pivoted at 110, one end of which is engaged by a pin 111 on the operating arm 51 and the other end of which is provided with a broad stud 112 normally just out of engagement with the teeth on disk 105. Upon an operation of the machine the pin 111 will pass away from the upper end of lever 109, thus allowing the lower end bearing stub 112 to be spring drawn downward to cause the stud 112 to engage one of the teeth on disk 105 to prevent an advance of the record strip by hand. This locking engagement is maintained throughout the operation of the machine and until the pin 111 again engages the upper end of lever 109 to withdraw the stud 112 from locking engagement with disk 105.

In the normal position of the table, (Fig. 4), a portion of the record strip is presented at the opening 72 in the cabinet to permit of a written entry being made on the strip by the operator. When such entry has been made and the machine operated to open the cash drawer, the table 59 will be swung to a position in which a printed entry may be had from the type carrier, in alinement with the written entry. The printed entry is taken from the type carrier by an impression roll 73, normally below the plate 60 of table 59 but adapted to move upward through an opening 74 in said plate to press the paper against the type carrier. The impression roll 73 is carried by a frame consisting of two plates 75 and 76 pivotally mounted at 77 to the table 59 and connected at their free ends by an eccentric disk 78 mounted on plate 75 and playing in a slot 79 formed in plate 76. This eccentric disk and slot connection is for controlling the amount of pressure applied by the impression means by a mere adjustment of the eccentric disk 78. The actuating device for the platen carrying frame is connected to the plate 76 as later described. In the normal position, the plates 75 and 76 act as a rigid frame, the power being applied to the plate 76, and the movement of plate 76 being transmitted to the platen carrying plate 75. If it is desired to change the pressure applied by the platen the eccentric disk is adjusted, thus moving the platen 75 relative to plate 76.

The forcing of the impression roll against the type is effected by the arms 55 in the following manner. A link 80 is pivotally connected to the plate 76 by a pin 81 and to the upper end of arm 55 by a pin 82 thus forming a toggle connection between the arm 55 and the impression roll frame. As herein designed, (see Fig. 3), the centers of pivot 81, stud pin 58, and shaft 56, are in a straight line, while that of pivot 82 is somewhat to the right of that straight line. In the normal position of lever 55 the left hand wall of slot 57 rests against stud pin 58. Before any movement of the table 59 can be effected the arm 55 must be rocked to an extent sufficient to cause the right hand wall of slot 57 to engage the stud pin 58. During this preliminary movement the center of pivot 82 will cross the line of the three centers above referred to, and the impression roll frame will be forced upward through the medium of toggle link 80. During such upward movement a stud 83 carried by plate 76 will enter a notch 84 formed in the end of a plate 85 mounted on the side frame of the machine thus locking the table against movement during the preliminary movement of arm 55. When the arm 55 has been swung to an extent sufficient to cause the right hand wall of slot 57 to engage the stud pin 58, the link 80 will be drawn down thereby restoring the impression roll frame to normal position and withdrawing the stud 83 from notch 84. Table 59 is locked in normal position until arm 55 is moved, by a stud 86 engaging a notch 87 in the upper side of the plate 85, said stud 86 being carried by a small bell crank lever 88 pivoted at 89 to the table. The downwardly extending arm 90 of said lever is adapted to be engaged and rocked by a pin 91 on link 80 during the preliminary movement of said arm. The rocking of lever 88 will disengage the stud 86 from notch 87 and the table 59 is then free to be moved.

Upon the continued operation of the machine the arm 55 will be swung its full extent toward the left in Fig. 3 and will carry the table 59 with it until the impression roll is in alinement with the adjusted type on the type carrier and the stud 83 is in alinement with a notch 92 formed in the plate 85. When the cash drawer is pushed in, an arm 55 will be swung back to normal position but owing to the slot and pin connection 57 and 58, will have a slight preliminary movement before picking up the table 59, as before described. During the preliminary movement the link 80 will again be actuated to raise the impression roll 73 to cause an impression to be made on the record strip. Simultaneous with such movement of the impression roll the stud 83 will enter the notch 92, thus locking the table in printing position to retain the impression roll in proper alinement with the adjusted type. Upon the continued return movement of arm 55, impression roll 73 will be lowered, stud 83 will be disengaged from notch 92, the left hand end of slot 57 will engage stud 58 and the table 59 will be carried back to normal writing position where stud 86 will again drop in notch 87 to lock the table in that position.

It will thus be seen that the paper carrying table is normally in a position such that the paper may be written on manually, but that the type carriers are distant from the paper. The operation of the machine rocks the table to position for printing, and the printing movement of the platen 73 is given by the toggle mechanism, at the beginning of the return stroke of the parts. Of course, with the construction shown, the platen frame is also elevated at the beginning of the operation when the table is in position for writing, but this is an idle operation and performs no function.

When table 59 is in any position intermediate the writing and printing positions the stud 83 will ride along the lower edge of plate 85 thus preventing any raising of the impression roll at such time.

It is obvious that any form of inking mechanism for the type may be employed but as that forms no part of the present invention no such mechanism has been shown.

A pair of arms 93 and 94 are pivoted to the side frame of the machine and are connected at any convenient point by a strong spring 95. The upper ends of these arms lie against the ends of plate 85 in the path of studs 83 and 86. Upon the forward and backward movement of the table the studs 83 and 86 strike against the arms thereby relieving the table of the jar of stopping in either of its extreme positions. The table is shown as having an extension 113, which when the table is moved to printing position is adapted to cover the writing opening 72, thus preventing any manipulation of the mechanisms through said opening.

While the construction of the parts as described compels the making of the written record before the operation of the machine in order to get the written record and the printed record side by side, still this is not at all essential and it is not desired to limit the claims to this particular order of operations.

While the form of mechanism shown herewith and described is admirably adapted to fulfil the objects primarily stated it is to be understood that it is not intended to confine the invention to the one form of embodiment herein shown and described as it is susceptible of embodiment in various forms all coming within the scope of the claims which follow.

What is claimed is:

1. In a cash register, the combination with a main operating member, of a type carrier, a movable printing and writing table carrying record material adapted to receive printed and written records, said table normally being out of printing position, and in a position to receive a written record, impression means also carried by said table, and connections controlled by said main operating member for moving said table to printing position, and operating said impression means.

2. In a cash register, the combination with a main operating member, of a type carrier, a movable printing and writing table carrying record, material adapted to receive printed and written records, said table normally being out of printing position, and in a position to receive a written record, impression means also carried by said table, connections controlled by said main operating member for moving said table to printing position, and operating said impression means, and means for locking said table in printing position during the operation of said impression means.

3. In a cash register, the combination with a type carrier, a movable printing and writing table carrying record material adapted to receive printed and written records, an impression means carried by said table for taking an impression from said type carrier, operating mechanism for moving said table and impression means, and connections intermediate said operating means and table permitting a movement of said operating mechanism in excess of the movement of said table, and connections intermediate said operating mechanism and impression means for operating the latter independent of the table to take an impression during such excess movement of the operating mechanism when the table is in printing position.

4. In a cash register, the combination with a type carrier, a movable printing and writing table carrying record material adapted to receive printed and written records, an impression means for taking an impression from said type carrier, operating mechanism for moving said table, connections intermediate said operating means and table permitting a movement of said operating mechanism in excess of the movement of said table, connections intermediate said operating mechanism and impression means for operating the latter to take an impression during such excess movement of the operating mechanism when the table is in printing position, and means preventing an operation of said impression means to take an impression when the platen is out of alinement with the proper type on the type carrier.

5. In a cash register, the combination with a type carrier, a movable printing and writing table carrying record material adapted to receive printed and written records, an impression means for taking an impression from said type carrier, operating mechanism for moving said table, connections intermediate said operating means and table permitting a movement of said operating mechanism in excess of the movement of said table, connections intermediate said operating mechanism and impression means for operating the latter to take an impression during such excess movement of the operating mechanism when the table is in printing position, and means for locking the table in such position while said impression is being taken.

6. In a cash register, the combination with a type carrier, a rocking printing and writing table bearing record material adapted to receive printed and written records said table normally being in a position to receive such written records, a rocking lever for rocking said table to printing position, a slot and pin connection between said lever and table to permit of a rocking movement of said lever slightly in excess of the movement of the table, an impression means and a toggle connection intermediate said rocking lever and impression means for operating the latter to take an impression during such excess movement of the rocking lever when the said table is at rest in printing position.

7. In a cash register, the combination with a main operating member, of a movable writing and printing table bearing a strip of record material adapted to receive printed and written records said table normally being in a position to receive a written record, a feeding device for automatically feeding said strip a certain distance in one direction, connections intermediate said main operating member and table for rocking the latter to printing position to receive a printed record and then restoring the table to normal writing position at each operation of the machine, and means for operating said feeding device during said movement of said table.

8. In a cash register, the combination with a main operating member, of a movable writing and printing table bearing a strip of record material adapted to receive printed and written records said table normally being in a position to receive a written record, a feeding device for automatically feeding said strip a certain distance in one direction, connections intermediate said main operating member and table for rocking the latter to printing position to receive a printed record in alinement with the written record and then restoring the table to normal writing position at each operation of the machine, and means for operating said feeding device during the restoring movement of said table.

9. In a cash register, the combination with a main operating member, of a movable writing and printing table bearing a strip of record material adapted to receive printed and written records said table normally being in a position to receive a written record, connections intermediate the main operating member and movable table for moving the latter to printing position and back to normal writing position at each operation of the machine, a manually operable means for advancing said record strip at will while the table is in writing position, and a locking device controlled by the movements of the main operating member for preventing an operation of said manually operable means except when the table is in writing position.

10. In a cash register, the combination with a movable printing and writing table carrying record material adapted to receive written and printed records said table normally being in a position to receive a written record, of operating mechanism for moving said table to printing position and back to normal position at each operation of the machine, and a locking device disabled by the movement of said operating mechanism for normally locking said table in writing position.

11. In a cash register, the combination with a pivoted paper carrying table and a platen arm pivoted on said table, of an actuating arm having a lost motion connection to said table and a toggle connection to said platen arm, said actuating arm causing a straightening of the toggle connections while the lost motion is being taken up, and thereafter rocking said table away from printing position.

12. In a cash register, the combination with a pivoted paper carrying table and a platen carrying arm pivoted to said table, of type carriers, an actuating arm pivoted coaxially with said table and having a lost motion connection to said table, a toggle arm pivoted to said actuating arm and to said carrying arm, and means for giving said actuating arm excursions of invariable extents, thereby straightening said toggle arm and forcing said platen against the type carriers while said lost motion is being taken up, and thereafter rocking said paper carrying table away from printing position by a continued movement of said actuating arm.

13. In a cash register, the combination with a casing having an opening, of a pivoted table normally adjacent said opening and carrying a record strip, type carriers, a main operating member, connections from said main operating member for oscillating said record table to a position adjacent said type carriers and back to its normal position at each operation of said operating member, and devices for moving an element of said table so as to force the record strip against said type wheels.

14. In a cash register, a record carrying table comprising a main supporting member, a platen, two links pivoted together at one end, one of which supports said platen, a pin connecting one of said links to said main supporting member, and an eccentric connecting the other ends of said links.

15. In a cash register, the combination with a movable printing and writing table carrying record material adapted to receive written and printed records; means for automatically feeding the record material at each operation of the machine; a bar supported by said table and having a collar fast thereon; a sleeve on said bar having the supply roll of the record material fast thereto; and a spring intermediate said sleeve and said collar and fast to the latter so that the sleeve is held in contact with the table to create friction and thereby prevent a too rapid unwinding of the record material when the same is fed by said feeding means.

16. In a cash register, the combination with a movable printing and writing table carrying record material adapted to receive written and printed records said table normally being in a position to receive a written record; of operating mechanism for moving said table to printing position and back to normal position at each operation of the machine; a locking device disabled by the movement of the operating mechanism for normally locking said table in writing position; and means for locking the table in printing position.

17. In a cash register, the combination with a casing having an opening; of a table carrying record material and normally adjacent said opening; type carriers; a main operating member; connections from said operating member for moving said record carrying material from its normal position to a position adjacent the type carriers and back again at each operation of said operating member; and means for locking the table in normal position and in its position adjacent the type carriers while an impression is being taken therefrom.

In testimony whereof I affix my signature in the presence of two witnesses.

WILLIAM A. CHRYST.

Witnesses:
R. C. GLASS,
CARL W. BEUST.